US008918482B2

(12) United States Patent
Ott et al.

(10) Patent No.: US 8,918,482 B2
(45) Date of Patent: Dec. 23, 2014

(54) USER PROFILE SYNCHRONIZATION

(75) Inventors: Jonathan Stephen Ott, Houston, TX (US); Kurke E. Bakow, Meridian, ID (US); Jeremy Pack, Calne (GB); Andrew Malschuk, Bristol (GB); Larry K. Gardner, Marietta, GA (US); Jens Weber, Baden-Wuerttemberg (DE); Jonathan Michael Hale, South Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 315 days.

(21) Appl. No.: 13/127,045

(22) PCT Filed: Oct. 31, 2008

(86) PCT No.: PCT/US2008/081980
§ 371 (c)(1),
(2), (4) Date: Apr. 30, 2011

(87) PCT Pub. No.: WO2010/050966
PCT Pub. Date: May 6, 2010

(65) Prior Publication Data
US 2011/0213862 A1    Sep. 1, 2011

(51) Int. Cl.
G06F 15/16    (2006.01)
G06F 9/445    (2006.01)
H04L 29/08    (2006.01)
G06F 11/16    (2006.01)

(52) U.S. Cl.
CPC ............ *G06F 9/4451* (2013.01); *H04L 67/306* (2013.01); *G06F 11/1662* (2013.01)
USPC ........................................................ 709/219

(58) Field of Classification Search
CPC ........................................................ G06F 15/16
USPC ........................................................ 709/219
See application file for complete search history.

(56) References Cited

U.S. PATENT DOCUMENTS

| 5,710,884 | A |  | 1/1998 | Dedrick |  |
|---|---|---|---|---|---|
| 7,092,944 | B2 |  | 8/2006 | Fukuta et al. |  |
| 2002/0188667 | A1 | * | 12/2002 | Kirnos | 709/203 |
| 2003/0041149 | A1 |  | 2/2003 | Ladds |  |
| 2006/0139312 | A1 | * | 6/2006 | Sinclair et al. | 345/156 |

(Continued)

FOREIGN PATENT DOCUMENTS

| CN | 1988535 A | 6/2007 |
|---|---|---|
| CN | 101098343 A | 1/2008 |

(Continued)

OTHER PUBLICATIONS

Drew Heywood; "Windows NT User Profiles", Sep. 1, 1997, pp. 1-6; http://www.windowsitpro.com/print/systems-administrator/windows-nt.

(Continued)

*Primary Examiner* — Shripal Khajuria

(57) ABSTRACT

A system, method, and program product comprise a user profile, a remote storage device and a user computer with a memory. A user copy of the user profile is stored in the memory of the user computer. A user profile synchronization component synchronizes the user copy of the user profile with a backup copy of the user profile at the remote storage device. A user profile download component allows a user to selectively download the backup copy of the user profile from the remote storage device.

20 Claims, 6 Drawing Sheets

(56) References Cited

U.S. PATENT DOCUMENTS

| | | |
|---|---|---|
| 2007/0180084 A1* | 8/2007 | Mohanty ................. 709/223 |
| 2007/0204326 A1* | 8/2007 | Bocking et al. ............. 726/1 |
| 2008/0034019 A1* | 2/2008 | Cisler et al. ............. 707/204 |
| 2008/0104395 A1 | 5/2008 | Dai et al. |

FOREIGN PATENT DOCUMENTS

| | | |
|---|---|---|
| CN | 101136938 A | 3/2008 |
| KR | 10-2005-0099910 | 10/2005 |
| WO | 99-23591 A1 | 5/1999 |

OTHER PUBLICATIONS

EPO; "Supplementary Partial European Search Report" for EP08877882 dated Jul. 5, 2012; 7 pages.

CN Search Report, corresponding application No. 200880131797.1, Oct. 25, 2012.

* cited by examiner

| Follow-Me Data Sync Center | X |

Below are the profiles currently saved.
Choose the profile you want to restore and then
Click the Restore Profile button Center

| Computer Model | Profile Date |
|---|---|
| 6510B | 11 Jun 2008 |
| TC4400 | 22 May 2008 |
| TC4400 | 29 May 2008 |

| Restore Profile | Cancel | Help |

Fig. 10

USER PROFILE SYNCHRONIZATION

BACKGROUND

The present disclosure relates generally to the field of computer systems. More specifically, the present disclosure relates to the use of user profiles for user computers.

Existing systems provide user profiles for use on user computers. These systems also provide for remote storage of user profiles on remote storage devices. The existing systems allow for download and synchronization of user profiles between user computers and remote storage devices. However, existing systems do not provide seamless interaction between a user computer configured to use user profiles and a user, particularly during synchronization and download of user profiles to the user computer.

Accordingly, there is a need for an improved user profile synchronization system.

SUMMARY

According to one disclosed embodiment, a system for user profile synchronization is provided that includes a user profile, a remote storage device, and a user computer with a memory. A user copy of the user profile is stored in the memory of the user computer. The system further includes a user profile synchronization component, that synchronizes the user copy of the user profile with a backup copy of the user profile stored at the remote storage device. The system further includes a user profile download component, that can download the backup copy of the user profile from the remote storage device to the user copy of the user profile, and can also allow a user to select not to download the backup copy of the user profile from the remote storage device.

According to another disclosed embodiment, a system for user profile synchronization is provided that includes a first user profile, a second user profile, a remote storage device, and a user computer with a memory. A user copy of the first user profile and a user copy of the second user profile are stored in the memory. The system further includes a user profile download component, that can allow a user to select to download a backup copy of the first user profile stored at the remote storage device to the user copy of the first user profile. The user profile download component further allows a user to select to download a backup copy of the second user profile stored at the remote storage device to the user copy of the second user profile. The user profile download component also allows a user to select to not download any user profiles from the remote storage device. The system further includes a user profile synchronization component, that synchronizes the user copy of the first user profile, when stored in the memory, with the backup copy of the first user profile, and synchronizes the user copy of the second user profile, when stored in the memory, with the backup copy of the second user profile.

According to yet another disclosed embodiment, a method for user profile synchronization is provided. The method includes the steps of identifying data elements that comprise a user profile, storing a user copy of the user profile on a user computer, synchronizing the user copy of the user profile with a backup copy of the user profile at a remote storage device, and selectively downloading the backup copy of the user profile from the remote storage device to the user copy of the user profile at the user computer.

According to another disclosed embodiment, a computer-readable medium having embodied thereon computer code which when executed causes a computer to perform a method is provided. The method includes the steps of identifying data elements that comprise a user profile, storing a user copy of the user profile on a user computer, synchronizing the user copy of the user profile with a backup copy of the user profile at a remote storage device, and selectively downloading the backup copy of the user profile from the remote storage device to the user copy of the user profile at the user computer.

BRIEF DESCRIPTION

FIG. 10 shows a computer program embodiment of a process for user profile download selection among a plurality of user profiles.

DETAILED DESCRIPTION

Embodiments of the present disclosure will be described below with reference to the accompanying drawings. It should be understood that the following description is intended to describe exemplary embodiments of the invention, and not to limit the invention.

The system of the present disclosure can be implemented in many different ways. The implementation of the present system is not limiting on the invention. In one embodiment, the system may be implemented by software executed on computers interconnected on a communication system. Alternatively, the present system may be implemented in hardware, or a combination thereof.

An exemplary computer for use in implementing the overall system or method or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

It should also be noted that the word "component" as used herein and in the claims is intended to encompass implementations using one or more lines of software code, and/or hardware implementations, and/or equipment for receiving manual inputs. Further, it is to be understood that the phrase "remote storage device" refers to any number of devices capable of storage. By way of example, a remote storage device may be a single server computer having a single hard disk drive. Alternatively, a remote storage device may be comprised of a plurality of server computers interconnected to one another having many hard disk drives. In such an embodiment, the server computers comprising the remote storage device can be remote from one another.

Figure 1:
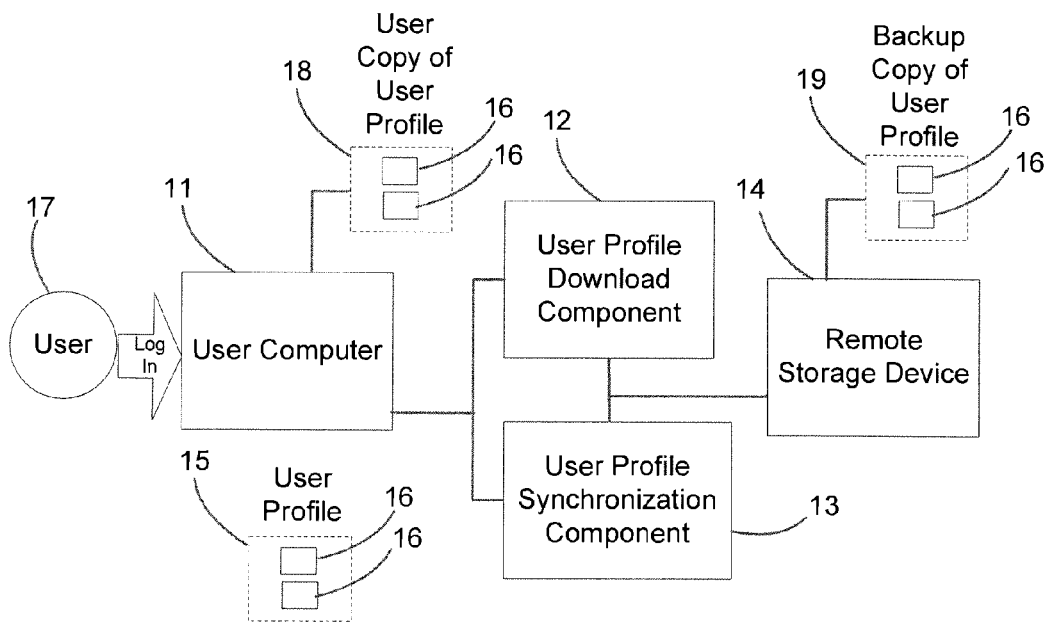
FIG. 1 is a schematic diagram of a user computer, a user profile, a user profile download component, a user profile synchronization component, and a remote storage device, according to one embodiment.

FIG. 1 is a schematic diagram of a user computer 11, a user profile download component 12, a user profile synchronization component 13, and a remote storage device 14, according to one embodiment. The user computer 11 includes a memory, wherein a user copy of the user profile 18 is stored. The user profile synchronization component 13 is configured to synchronize the user copy of the user profile 18 stored in the memory of the user computer 11 with a backup copy of the user profile 19 stored at the remote storage device 14. The user profile download component 12 is configured to download the backup copy of the user profile 19 to the user copy of the user profile 18 and also to allow a user of the user computer 11 to select to not download the backup copy of the user profile 19 from the remote storage device 14. A user profile 15 is comprised of data elements 16. The data elements 16 of the user profile 15 may be comprised of information specific to a user of a user computer. Alternatively, data elements 16 may be collections of information.

Figure 2:
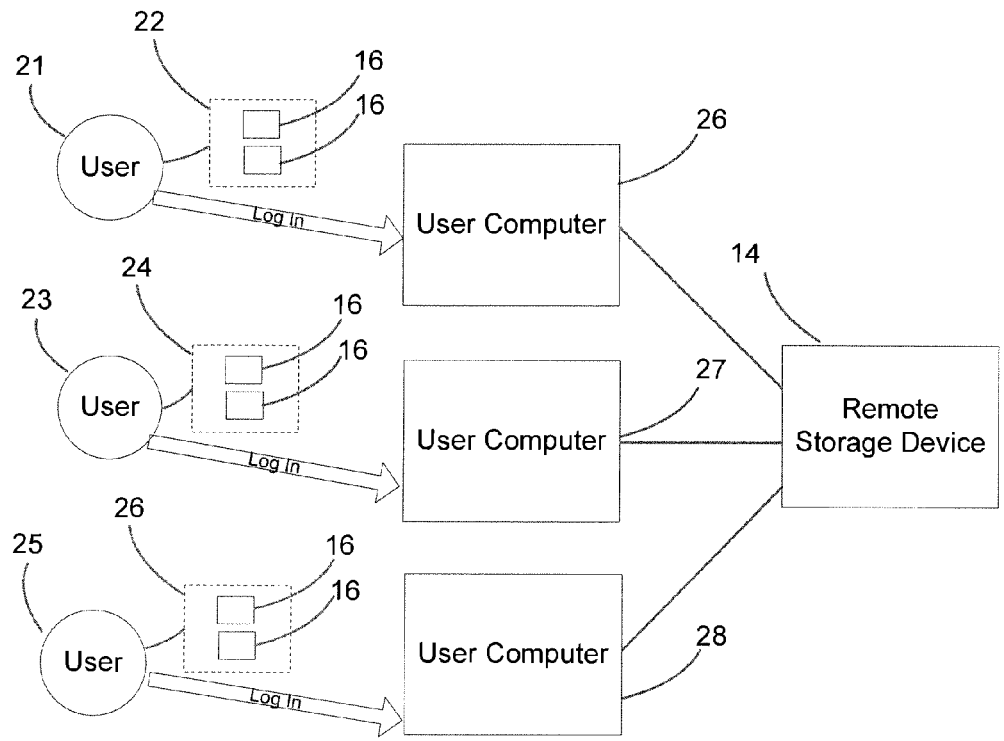
FIG. 2 is a schematic diagram of a remote storage device, user computers, user profiles, and users, according to one embodiment.

Referring now to FIG. 2, FIG. 2 is a schematic diagram of a remote storage device 14, user computers (26-28), user profiles (22, 24, 26), and users (21, 23, 25), according to one embodiment. In some computer system environments incorporating embodiments of the present disclosure, there can be many users (21, 23, 25), each of whom is associated with a user profile (22, 24, 26). By way of example user 21 is associated with user profile 22. User 23 is associated with user profile 24. User 25 is associated with user profile 26. Additionally in such environments, many of the user computers are configured to allow multiple users to log in to a single user computer. By way of example, user 21 may log in to user computer 26, while user 23 logs in to user computer 27.

Referring now back to FIG. 1. When a user 17 logs into a user computer 11, the user profile download component 12 allows the user to select whether to download the backup copy of the user profile 19 associated with that user 17. In the system of the present disclosure, a user copy of the user profile 18 is stored in a memory of any user computer 11 that a user 17 logs into and selects to download a backup copy 19 their user profile 15. Accordingly, if the user selects to download the backup copy 19, the user profile download component 12 determines first if there is any copy of the user profile 15 in the memory of the user computer 11 that the user 17 has logged into. If there is no copy of the user profile 15, the user profile download component 12 downloads the backup copy of the user profile 19 stored at the remote storage device 14 to create a user copy of the user profile 18 stored in the memory of the user computer 11. Otherwise, in some embodiments, the backup copy of the user profile 19 is copied in its entirety and replaces the user copy of the user profile 18. In an alterative embodiment, sub-divided portions of data elements 16 of the backup copy of the user profile 19 are copied to replace the corresponding sub-divided portions of data elements 16 of the user copy of the user profile 18 or are appended to the end of the user copy of the user profile 18 in the case where there is no corresponding sub-divided portion.

Alternatively, the user profile download component 12 determines whether any sub-divided portions of the data elements 16 need to be updated or whether any sub-divided portions of data elements 16 need to be appended to the user copy of the user profile 18 stored in the memory of the user computer 11 based on the backup copy of the user profile 19 stored at the remote storage device 14. The user profile download component 12 can determine which sub-divided portions of any data elements 16 need to be updated by comparing sub-divided portions of data elements 16 of the user copy of the user profile 18 with the corresponding sub-divided portions of data elements 16 of the backup copy of the user profile 19. If any portions of any data elements 16 need to be updated, the user profile download component 12 downloads those portions of the data elements 16 from the backup copy of the user profile 19 and updates the corresponding portions of data elements 16 in the user copy of the user profile 18. Additionally, the user profile download component 12 can append sub-divided portions of data elements 16 of the backup copy of the user profile 19 that do not exist in the user copy of the user profile 18 to the user copy of the user profile 18. In some instances, a user 17 is not currently associated with a user profile 15. Accordingly, a user profile 15 can be created. If a user 17 selects not to download the backup copy of user profile 19, the user computer 11 loads a default user profile.

In computer system environments incorporating embodiments of the present disclosure which allow many users to log in to many different user computers, there may be multiple user copies of a user profile on multiple different user computers. User profile synchronization components are configured to perform conflict resolution by determining whether there are multiple copies of a user profile stored on multiple different computers. If multiple copies are found, the user profile synchronization component queries the user to leave the conflict unresolved, to retain the user copy of the user profile currently stored in the memory of the user computer accessed by the user, to select among the user copies of the user profile, or to select the most recent user copy of the user profile. By way of example, if a user 17 logs into a user computer 11, and the user profile synchronization component 13 discovers there are multiple user copies of a user profile 15, the user profile synchronization component 13 queries the user 17, and the user can select among the user copies of the user profile 15.

Figure 3:
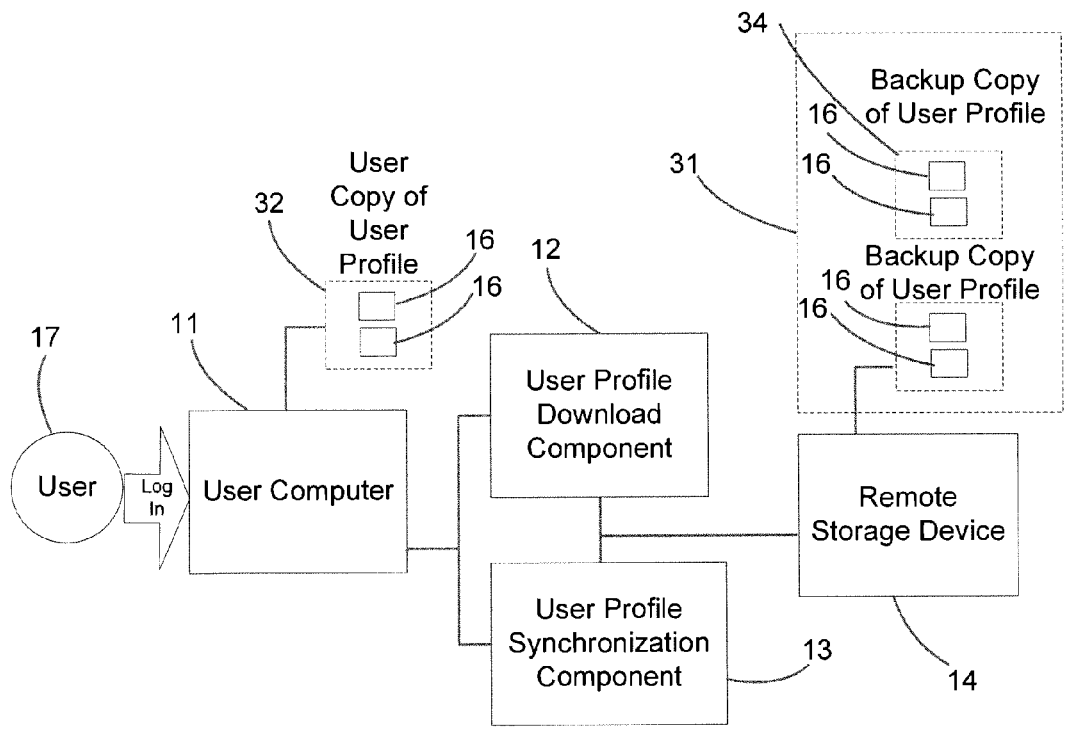
FIG. 3 is a schematic diagram of a user computer, a plurality of user profiles, a user profile download component, a user profile synchronization component, and a remote storage device, according to one embodiment.

Referring now to FIG. 3, FIG. 3 is a schematic diagram of a user computer 11, a plurality of user profiles 31, a user profile download component 12, a user profile synchronization component 13, and a remote storage device 14, according to one embodiment. There can be a plurality of user profiles 31 associated with a user 17. The plurality of user profiles 31 can be stored on the remote storage device 14 as backup copies. In the system of the present disclosure, a user copy of any selected user profile 32 is stored in a memory of any user computer 11 that a user 17 logs into and selects to download the selected user profile 32. When a user 17 logs into a user computer 11, the user profile download component 12 allows the user to select among the plurality of user profiles 31 to download one of the plurality of user profiles 31. The user profile download component 12 also allows a user to not download any of the plurality of user profiles 31. Accordingly, if the user 17 selects to download a selected user profile 32 of the plurality of user profiles 31, the user profile download component 12 determines if there is a user copy of the selected user profile 32 in the memory of the user computer 11 that the user 17 has logged into. If there is no user copy of the selected user profile 32, the profile download component 12 downloads the backup copy of the selected user profile 34 stored at the remote storage device 14 to create a user copy of the selected user profile 32 stored in the memory of the user computer 11. Otherwise, in some embodiments, the backup copy of the selected user profile 34 is copied in its entirety and replaces the user copy of the selected user profile 32. In an alternative embodiment, sub-divided portions of data elements 16 of the backup copy of the selected user profile 34 are copied to replace the corresponding sub-divided portions of data elements 16 of the user copy of the selected user profile 32 or are appended to the end of the user copy of the selected user profile 32 in the case where there is no corresponding sub-divided portion.

Alternatively, the user profile download component 12 determines whether any portions of the data elements 16 of the user copy of the selected user profile 32 need to be updated or whether any sub-divided portions of data elements 16 need to be appended to the user copy of the selected user profile 32 stored in the memory of the user computer 11 based on the backup copy of the selected user profile 34 stored at the remote storage device 14. The user profile download component 12 can determine which portions of any data elements 16 need to be downloaded by comparing sub-divided portions of data elements 16 of the user copy of the selected user profile 32 with the backup copy of the selected user profile 34. If any portions of any data elements 16 need to be updated, the user profile download component 12 downloads those portions of the data elements 16 from the backup copy of the selected user profile 34 and updates the corresponding portions of data elements 16 in the user copy of the selected user profile 32. Additionally, the user profile download component 12 can append sub-divided portions of data elements 16 of the backup copy of the selected user profile 34 that do not exist in the user copy of the selected user profile 32 to the user copy of the selected user profile 32. If a user selects not to download any of the plurality of user profiles 31, the user computer 11 loads a default user profile.

In computer system environments incorporating embodiments of the present disclosure which allow many users to log in to many different user computers, there may be multiple user copies of a selected user profile from a plurality of user profiles associated with a user on multiple different user computers. User profile synchronization components are configured to perform conflict resolution by determining whether there are multiple user copies of the selected user profile stored on multiple different computers. If multiple user copies are found, the user profile synchronization component queries the user to select to leave the conflict unresolved, to retain the user copy of the selected user profile currently stored in the memory of the user computer accessed by the user, to select among the user copies of the selected user profile, or to select the most recent user copy of the selected user profile. By way of example, if a user 17 logs into a user computer 11, and the user profile synchronization component 13 discovers there are multiple user copies of selected user profile 32, the user profile synchronization component 13 queries the user 17, and the user 17 may select to retain the user copy of the selected user profile 32 currently stored in the memory of the user computer 11.

In some embodiments, a user may determine the total number of the plurality of user profiles 31. In other embodiments, the total number of the plurality of user profiles 31 is determined by a systems administrator. Additionally, in some embodiments, a user or systems administration may create the plurality of user profiles 31 to have a range of total computer data size. Accordingly, a user may create a smallest user profile within the plurality of user profiles 31 that has the smallest computer data size in comparison with the remainder of the plurality of user profiles 31, such that if the user selects the smallest user profile when logging into a user computer 11, the user profile download component 12 can download any portions of data elements necessary or an entire copy of the selected smallest user profile quickly.

Referring now to FIG. 1, the user profile synchronization component 13 synchronizes a user profile 15 with the remote storage device 14. The synchronization occurs between a user copy of the user profile 18 stored in the memory of the user computer 11 and a backup copy of the user profile 19 stored at the remote storage device 14. In some embodiments, the entire user copy of the user profile 18 is transferred to the remote storage device 14 and replaces the backup copy of the user profile 19 stored at the remote storage device 14. In an alternative embodiment, the synchronization occurs by transferring sub-divided portions of data elements 16 of the user copy of the user profile 18 to the remote storage device 14 and replacing corresponding sub-divided portions of data elements 16 of the backup copy of the user profile 19 or appending sub-divided portions of data elements 16 to the end of the backup copy of the user profile 19 in the case where there is no corresponding sub-divided portion.

Alternatively, the synchronization occurs by comparing sub-divided portions of the data elements 16 comprising the user copy of the user profile 18 stored in the memory of user computer 11 with the corresponding sub-divided portions of the data elements 16 comprising the backup copy of the user profile 19 stored at the remote storage device 14. If the user profile synchronization component 13 determines that any sub-divided portion of any one of the data elements 16 differs between the user copy of the user profile 18 and the backup copy of the user profile 19, each of those sub-divided portions of data elements 16 are transferred from the user copy of the user profile 18 to the backup copy of the user profile 19. In such an embodiment, if there is no corresponding sub-divided portion, the sub-divided portion is copied from the user copy of the user profile 18 and is appended to the end of the backup copy of the user profile 19. In some embodiments, the synchronization occurs at a predetermined time interval. In other embodiments, the synchronization occurs on-demand.

Referring now to FIG. 3, the user profile synchronization component 13 can synchronize any of the plurality of user profiles 31 with the remote storage device 14. The synchronization occurs between a user copy of a selected user profile 32 of the plurality of user profiles 31 stored in the memory of the user computer 11 and a backup copy of the selected user profile 34 stored at the remote storage device 14. In some embodiments, an entire copy of the user copy of the selected user profile 32 is transferred to the remote storage device 14 and replaces the backup copy of the selected user profile 34. In an alternative embodiment, the synchronization occurs by transferring sub-divided portions of data elements 16 of the user copy of the selected user profile 32 to the remote storage device 14 and replacing corresponding sub-divided portions of data elements 16 of the backup copy of the selected user profile 34 or appending sub-divided portions of data elements 16 to the end of the backup copy of the selected user profile 34 in the case where there is no corresponding sub-divided portion.

Alternatively, the synchronization occurs by comparing sub-divided portions of the data elements 16 comprising the user copy of the selected user profile 32 with the corresponding sub-divided portions of the data elements 16 comprising the backup copy of the selected user profile 34. If the user profile synchronization component 13 determines that any sub-divided portion of any one of the data elements 16 differs between the user copy of the selected user profile 32 and the backup copy of the selected user profile 34, each of those sub-divided portions of data elements 16 are transferred from the user copy of the selected user profile 32 to the backup copy of the selected user profile 34. In such an embodiment, if there is no corresponding sub-divided portion the sub-divided portion is copied from the user copy of the selected user profile 32 and is appended to the end of the backup copy of the selected user profile 34. In some embodiments, the synchronization occurs at a predetermined time interval. In other embodiments, the synchronization occurs on-demand.

Figure 4:
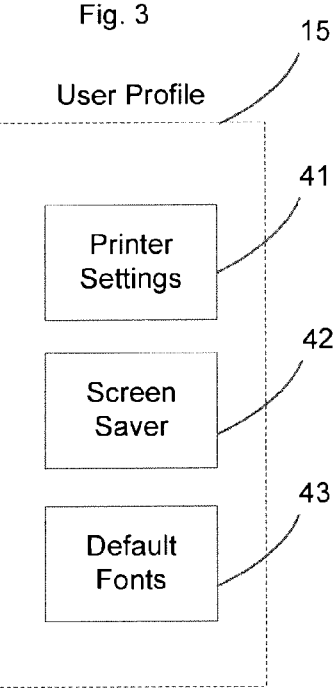
FIG. 4 is a schematic diagram of a user profile, according to one embodiment.

Referring now to FIG. 4, FIG. 4 is a schematic diagram of a user profile 15, according to one embodiment. A user profile 15 is comprised of information specific to a user of a user computer 11. Accordingly, a user profile 15 can include printer settings 41, a screen saver 42, and default fonts 43, for example.

Figure 5:
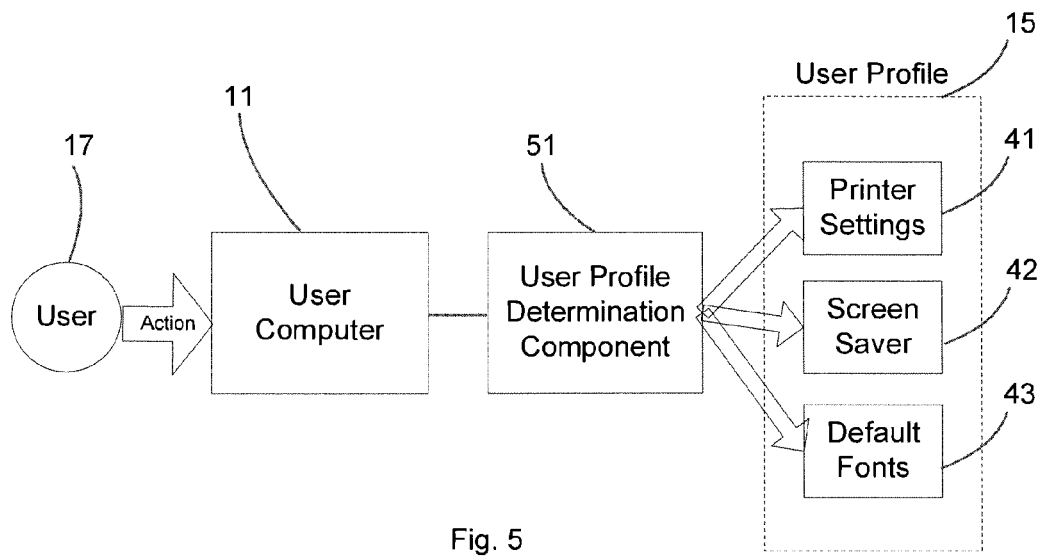
FIG. 5 is a schematic diagram of a user computer and a user profile determination component, according to one embodiment.

Referring now to FIG. 5, FIG. 5 is a schematic diagram of a user computer 11 and a user profile determination component 51, according to one embodiment. The user profile determination component 51 can allow a user 17 of a user computer 11 to select those data elements of the user computer 11 that comprise a user profile 15. In the illustrated embodiment, a user 17 causes the user profile determination component 51 to select printer settings 41, screen saver 42, and default fonts 43 as the data elements comprising the user profile 15.

Figure 6:
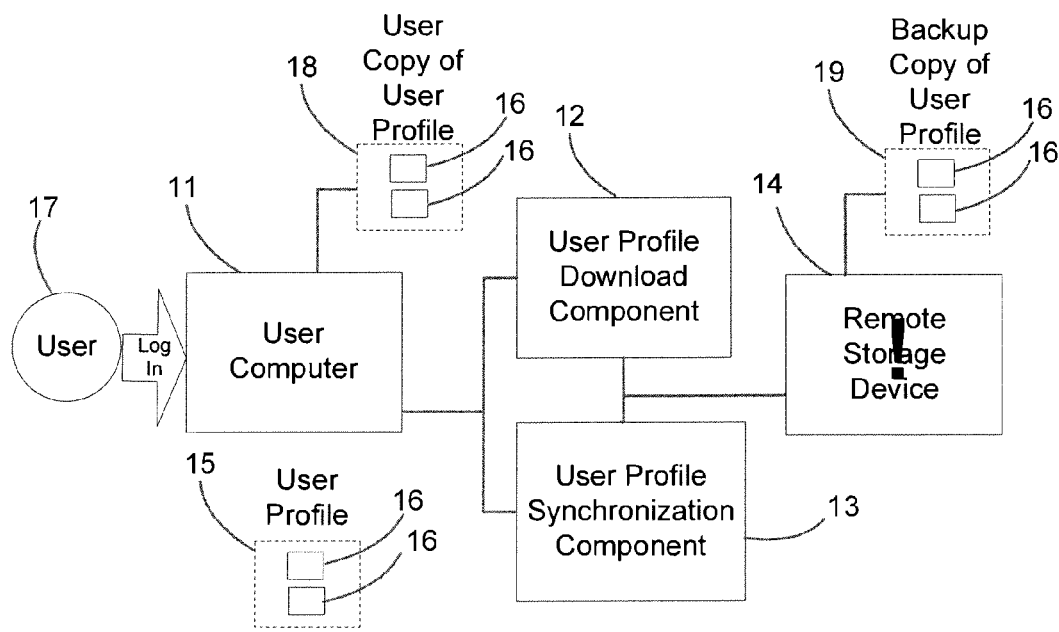
FIG. 6 is a schematic diagram of a user computer, a user profile, a user profile download component, a user profile synchronization component, and a remote storage device that has experienced a failure, according to one embodiment.

Referring now to FIG. 6, FIG. 6 is a schematic diagram of a user computer 11, a user profile 15, a user profile download component 12, a user profile synchronization component 13, and a remote storage device 14 that has experienced a failure, according to one embodiment. The failure experienced by the remote storage device 14 can be an internal storage failure such as a failed hard disk drive, or a failed RAID disk array. The user profile synchronization component 13 can detect the failure of the remote storage device 14. Typically, when a remote storage device 14 fails, the remote storage device 14 is either replaced or repaired. During the failure of a remote storage device 14, some data can be lost and become unavailable. Accordingly, upon replacement or repair, a remote storage device 14 could be missing some data. The user profile synchronization component 13 can detect the failure of a remote storage device 14, and can synchronize a user copy of a user profile 18 stored in the memory of a user computer 11 with a new backup copy of the user profile 19 stored at the remote storage device 14. This allows the remote storage device 14 to restore at least a user copy of a user profile 18.

It is to be understood that in the system of the present disclosure, there may be more recent user copies of a user profile 15 stored in the memories of other user computers. As such, if a user logs into a user computer with a more recent user copy of a user profile 15, that user copy of the user profile 15 will be synchronized with the backup copy of the user profile 19 stored at the remote storage device 14 by the user profile synchronization component 13 of the user computer possessing the more recent user copy of the user profile 15.

Figure 7:
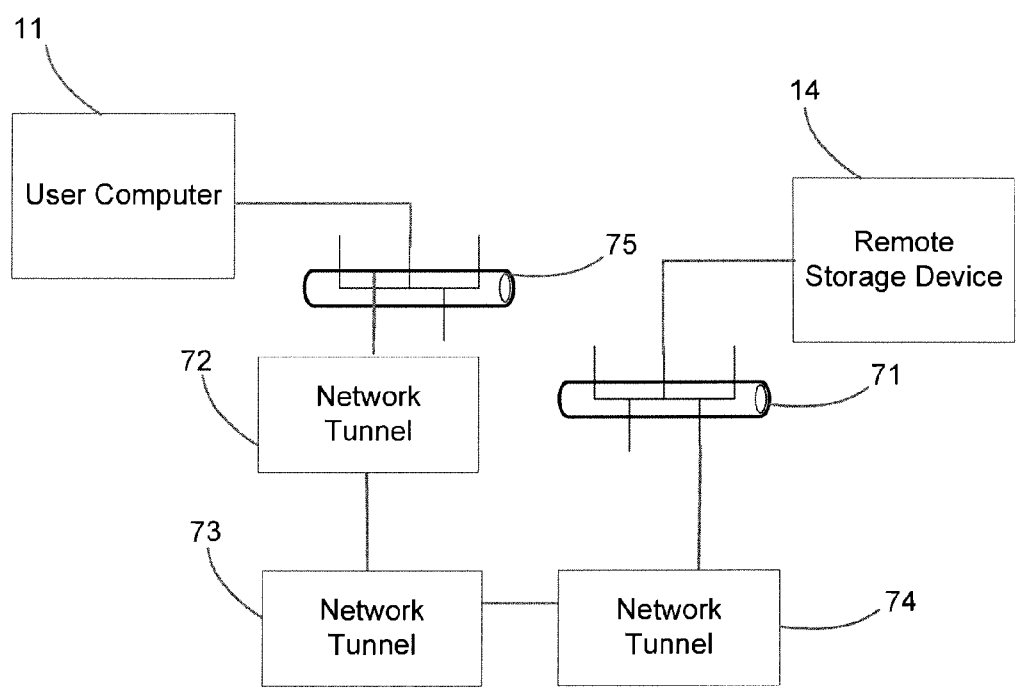
FIG. 7 is a schematic diagram of a user computer, a remote storage device, a series of network tunnels and two local area networks, according to one embodiment.

Referring now to FIG. 7, FIG. 7 is a schematic diagram of a user computer 11, a remote storage device 14, a series of network tunnels (72-74) and two local area networks (71 and 75), according to one embodiment. In some embodiments of the present invention, a user computer 11 can be uncharacteristically remote from the remote storage device 14. By way of example, the user computer 11 can be connected to a first local area network 75. The user computer 11 can communicate to the remote storage device 14 connected to a second local area network 71 through a series of network tunnels (72-74). A network tunnel (72-74) may be comprised of mechanism of data transmission through an un-trusted network. Alternatively, a network tunnel (72-74) may be provided to allow more efficient transport of data over long geographic distances. The remoteness of the connection between the user computer 11 and the remote storage device 14 is such that the speed of any communications between the user computer 11 and the remote storage device 14 can be slow. The user profile synchronization component 13 and the user profile download component 12 (as shown in FIG. 1 and previously discussed) reduce the impact of such slow interconnection speeds. In particular, the user profile synchronization component 13 synchronizes user profiles with the remote storage device 14, while the user profile download component 12 allows a user of a user computer to selectively download user profiles. These two components allow for the use of a user profile stored at remote storage device 14 that appears seamless to a user of a user computer.

By way of example, referring now to FIG. 1, a user 17 may log in to a user computer 11. When the user 17 logs in to the user computer 11, the user 17 may select to download the backup copy of the user profile 19. The user download profile component 12 may begin to download the backup copy of the user profile 19 to the user copy of the user profile 18. However, while the user profile download component 12 is downloading the backup copy of the user profile 19, the user 17 may continue to use the user computer 11 un-interrupted by the user profile download component 12. In some instances, there may not be a user copy of the user profile 18 currently stored in the memory of the user computer 11. In such an instance, the user 17 may use a default user profile while the backup copy of the user profile 19 is being downloaded by the user profile download component 12. Further, while the user 17 is using the user computer 11, the user copy of the user profile 18 may be synchronized with the backup copy of the user profile 19 at the remote storage device 14 by the user profile synchronization component 13. Such synchronization may be accomplished in whole or in part as previously discussed. Accordingly, the backup copy of the user profile 19 stays current, and synchronization is performed by the user profile synchronization component 13 such that the user 17 of the user computer 11 is un-interrupted.

Figure 8:
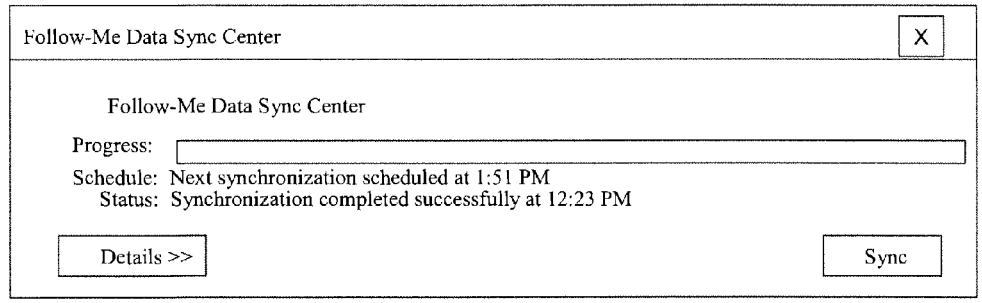
FIG. 8 shows a computer program embodiment of the invention.

Referring now to FIG. 8, there is shown a screen shot for a computer program embodiment illustrating the status of the user profile synchronization component, according to one embodiment.

Figure 9:
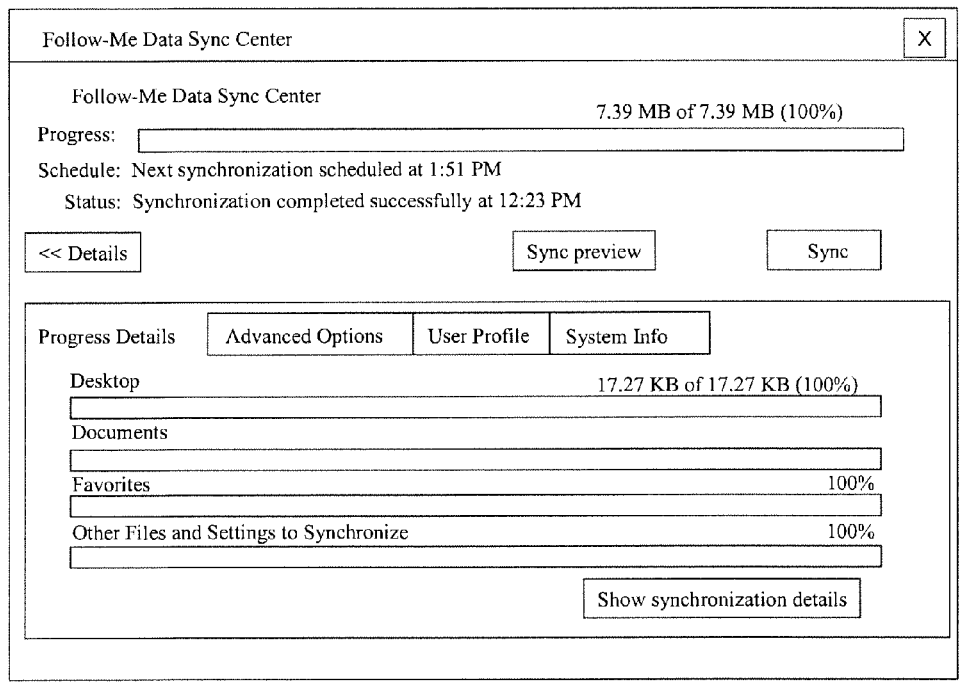
FIG. 9 shows a computer program embodiment for resolving conflicts between copies of a user profile.

Referring now to FIG. 9, there is shown a computer program embodiment illustrating resolution of conflicts between copies of a user profile by a user profile synchronization component.

FIG. 10 shows a screen shot for a computer program embodiment illustrating user profile download component selection among a plurality of user profiles.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for user profile synchronization, comprising: a user profile;
   a remote storage device;
   a user computer configured with a memory, wherein the memory is configured to store a user copy of the user profile, the user profile specific to a user;
   a user profile synchronization component, configured to synchronize the user copy of the user profile with a backup copy of the user profile stored at the remote storage device; and
   a user profile download component, configured when the user logs onto the user computer to download the backup copy of the user profile from the remote storage device to the user copy of the user profile for usage on the user computer, and to allow a user to select not to download any backup copy of the user profile, including the backup copy of the user profile, from any remote storage device, including the remote storage devices wherein the user profile download component is to in response to determining that multiple different copies of the user profile are stored on the remote storage device, query the user as to whether the user wants to select a current copy of the user profile present on the user computer to use on the user computer and in response to the user selecting the current copy of the user profile present on the user computer, use the current copy of the user profile on the user computer.

2. The system of claim 1, further comprising:
   a user profile determination component, configured to allow a user to select a set of data elements of the user computer comprising the user profile.

3. The system of claim 1, wherein the user profile synchronization component is configured to synchronize the user copy of the user profile with the backup copy of the user profile at a predetermined time interval.

4. The system of claim 1, wherein the user profile synchronization component is further configured to recognize a failure of the remote storage device, and to synchronize the user copy of the user profile stored in the memory with a new backup copy of the user profile stored at the remote storage device.

5. The system of claim 1, wherein the user profile synchronization component is further configured to recognize a conflict between a set of user copies of the user profile stored on multiple user computers, and to query the user to select among a set of options comprising: leaving the conflict unresolved, retaining the user copy of the user profile in the memory, selecting among the set of user copies of the user profile, and selecting a most recent user copy of the user profile.

6. The system of claim 1, further comprising a plurality of user profiles,
   wherein a user copy of each of the plurality of user profiles is stored in the memory, the user profile synchronization component is configured to synchronize each of the user copies of the plurality of user profiles with a backup copy of each of the plurality of user profiles stored at the remote storage device, and the user profile download component is configured to allow a user to select a selected backup copy of a user profile and to download the selected backup copy of the user profile from the remote storage device, and to allow a user to not select any of the backup copies of the plurality of user profiles.

7. The system of claim 1, wherein the user profile download component is to:
   when the user has logged onto the user computer, determine whether multiple different copies of the user profile are stored on the remote storage device; and
   in response to determining that the multiple different copies of the user profile are stored on the remote storage device, query the user as to how to proceed.

8. The system of claim 7, wherein the user profile download complement is query the user as to how to proceed by querying the user as to whether user wants to:
   select the current copy of the user profile present on the user computer to use on the user computer;
   select a most recent copy of the multiple different copies of the user profile stored on the remote storage device to use on the user computer; or select a user-specified copy of the multiple different copies of the user profile stored on the remote storage device to use on the user computer.

9. The system of claim 8, where the user profile download component is further to, in response to the user selecting the most recent copy of the user profile stored on the remote storage device: determine and download the most recent copy of the user profile stored on the remote storage device; and
   after downloading has been completed, use the most recent copy of the user profile on the user computer.

10. The system of claim 8, where the user profile download component is further to, in response to the user selecting the user-specified copy of the user profile stored on the remote storage device: download the user-specified copy of the user profile stored on the remote storage device; and
    after downloading has been completed, use the user-specified copy of the user profile on the user computer.

11. A method for user profile synchronization, comprising:
    determining, when a user logs onto a user computer, whether a user profile is currently stored in a memory of the user computer, the user profile specific to the user;
    in response to determining that the user profile is currently stored in the memory of the user computer, refraining from downloading any backup copy of the user profile stored at any remote storage device, such that the user profile currently stored in the memory of the user computer is used for the user at the user computer;
    and in response to determining that the user profile is not currently stored in the memory of the user computer, automatically downloading the backup copy of the user profile stored at the remote storage device to the memory of the user computer, such that the backup copy of the user profile downloaded to the memory of the user computer is used for the user at the user computer;
    determining whether multiple different copies of the user profile are stored on the remote storage device:
    in response to determining that the multiple different copies of the user profile are stored on the remote storage device, query the user as to whether user wants to: select a current copy of the user profile present on the user computer to use on the user computer select a most recent copy of the multiple different copies of the user profile stored on the remote storage device to use on the user computer: or select a user-specified copy of the multiple different copies of the user profile stored on the remote storage device to use on the user computer and
    in response to the user selecting the current copy of the user profile present on the user computer, use the current copy of the user profile on the user computer.

12. The method of claim 11, further comprising synchronizing a user copy of the user profile with a backup copy of the user profile at a remote storage device.

13. The method of claim 12, wherein synchronizing further comprises recognizing a failure of the remote storage device, and synchronizing the user copy of the user profile with a new backup copy of the user profile at the remote storage device in response to the failure.

14. The method of claim 12, wherein synchronizing further comprises recognizing a conflict between a set of user copies of the user profile stored on multiple user computers, and selecting among a set of options comprising: leaving the conflict unresolved, retaining the user copy of the user profile in the memory, selecting among the set of user copies of the user profile, and selecting a most recent user copy of the user profile.

15. The method of claim 12, wherein synchronizing comprises synchronizing a plurality of user copies of user profiles with a plurality of backup copies of user profiles at the remote storage device, and the step of selectively downloading comprises selectively downloading a selected backup copy of a user profile from the remote storage device.

16. A non-transitory computer-readable medium having embodied therein computer code which when executed causes a computer to perform a method comprising:
   determining when a user logs onto a user computer whether a user profile is currently stored in a memory of the user computer, the user profile specific to the user;
   in response to determining that the user profile is currently stored in the memory of the user computer, refraining from downloading any backup copy of the user profile stored at any remote storage device, such that the user profile currently stored in the memory of the user computer is used for the user at the user computer; and
   in response to determining that the user profile is not currently stored in the memory of the user computer, automatically downloading the backup copy of the user profile stored at the remote storage device to the memory of the user computer, such that the backup copy of the user profile downloaded to the memory of the user computer is used for the user at the user computer; determining whether multiple different copies of the user profile are stored on the remote storage device:
   in response to determining that the multiple different copies of the user profile are stored on the remote storage device query the user as to whether user wants to; select a current copy of the user profile present on the user computer to use on the user computer:
   select a most recent copy of the multiple different copies of the user profile stored on the remote storage device to use on the user computer: or select a user-specified copy of the multiple different copies of the user profile stored on the remote storage device to use on the user computer; and
   in response to the user selecting the current copy of the user profile present on the user computer, use the current copy of the user profile on the user computer.

17. The non-transitory computer-readable medium of claim 16, wherein the method further comprises synchronizing a user copy of the user profile with a backup copy of the user profile at a remote storage device.

18. The non-transitory computer-readable medium of claim 17, wherein synchronizing further comprises recognizing a failure of the remote storage device, and synchronizing the user copy of the user profile with a new backup copy of the user profile at the remote storage device in response to the failure.

19. The non-transitory computer-readable medium of claim 17, wherein synchronizing further comprises recognizing a conflict between a set of user copies of the user profile stored on multiple user computers, and selecting among a set of options comprising: leaving the conflict unresolved, retaining the user copy of the user profile in the memory, selecting among the set of user copies of the user profile, and selecting a most recent user copy of the user profile.

20. The non-transitory computer-readable medium of claim 17, wherein synchronizing comprises synchronizing a plurality of user copies of user profiles with a plurality of backup copies of user profiles at the remote storage device, and the step of selectively downloading comprises selectively downloading a selected backup copy of a user profile from the remote storage device.

* * * * *

UNITED STATES PATENT AND TRADEMARK OFFICE
CERTIFICATE OF CORRECTION

PATENT NO.         : 8,918,482 B2
APPLICATION NO.    : 13/127045
DATED              : December 23, 2014
INVENTOR(S)        : Jonathan Stephen Ott et al.

It is certified that error appears in the above-identified patent and that said Letters Patent is hereby corrected as shown below:

In the Claims

In column 9, line 20 approx. in Claim 1, delete "devices" and insert -- device; --, therefor.

In column 10, line 41 approx. in Claim 11, delete "and in" and insert -- in --, therefor.

In column 10, line 49 approx. in Claim 11, delete "device:" and insert -- device; --, therefor.

In column 10, line 54 approx. in Claim 11, delete "computer" and insert -- computer; --, therefor.

In column 10, line 57 approx. in Claim 11, delete "computer:" and insert -- computer; --, therefor.

In column 10, line 59 approx. in Claim 11, delete "computer" and insert -- computer; --, therefor.

In column 11, line 29 approx. in Claim 16, delete "computer; and" and insert -- computer; --, therefor.

In column 11, line 38 approx. in Claim 16, delete "device:" and insert. -- device; --, therefor.

In column 12, line 1 approx. in Claim 16, delete "device" and insert -- device, --, therefor.

In column 12, line 1 approx. in Claim 16, delete "to;" and insert -- to: --, therefor.

In column 12, line 3 approx. in Claim 16, delete "computer:" and insert -- computer; --, therefor.

In column 12, line 6 approx. in Claim 16, delete "computer:" and insert -- computer; --, therefor.

Signed and Sealed this
Twenty-first Day of July, 2015

Michelle K. Lee
*Director of the United States Patent and Trademark Office*